United States Patent Office 3,027,213
Patented Mar. 27, 1962

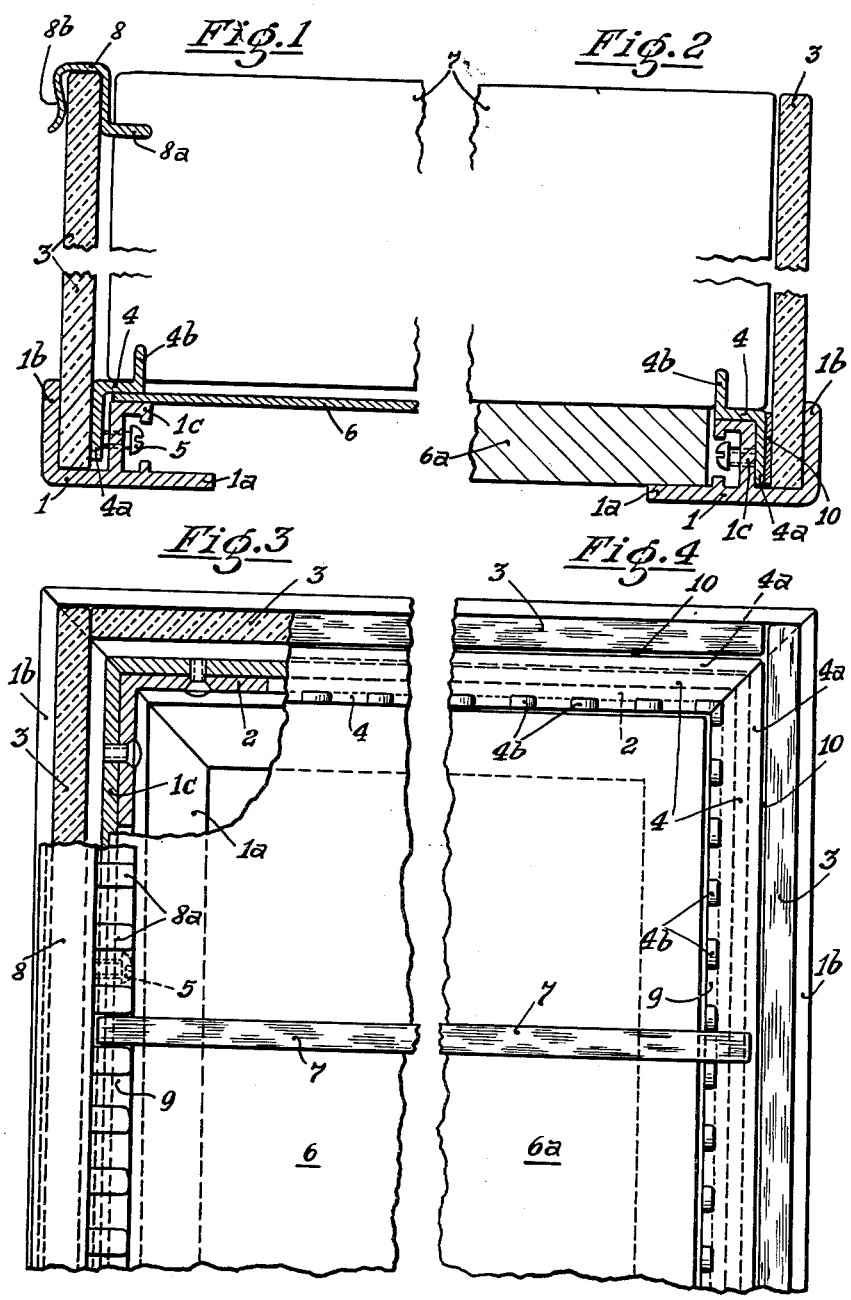

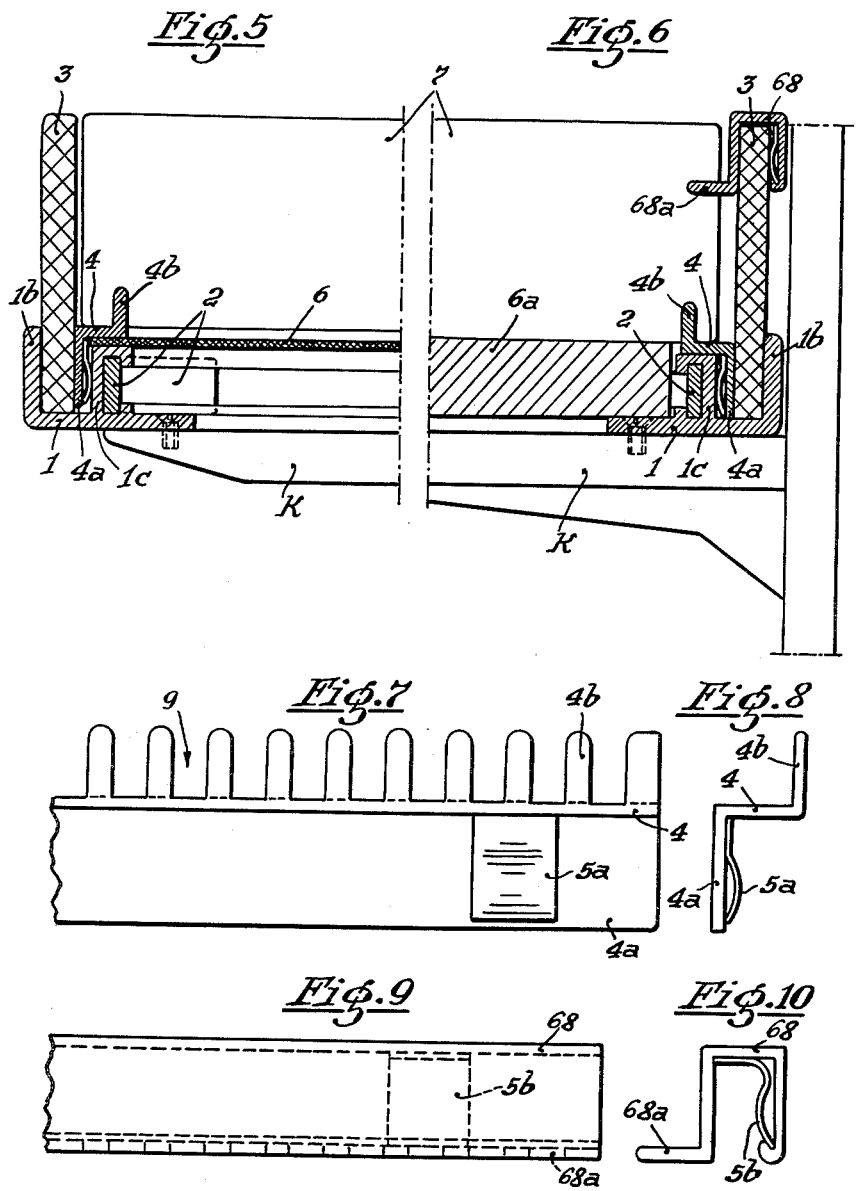

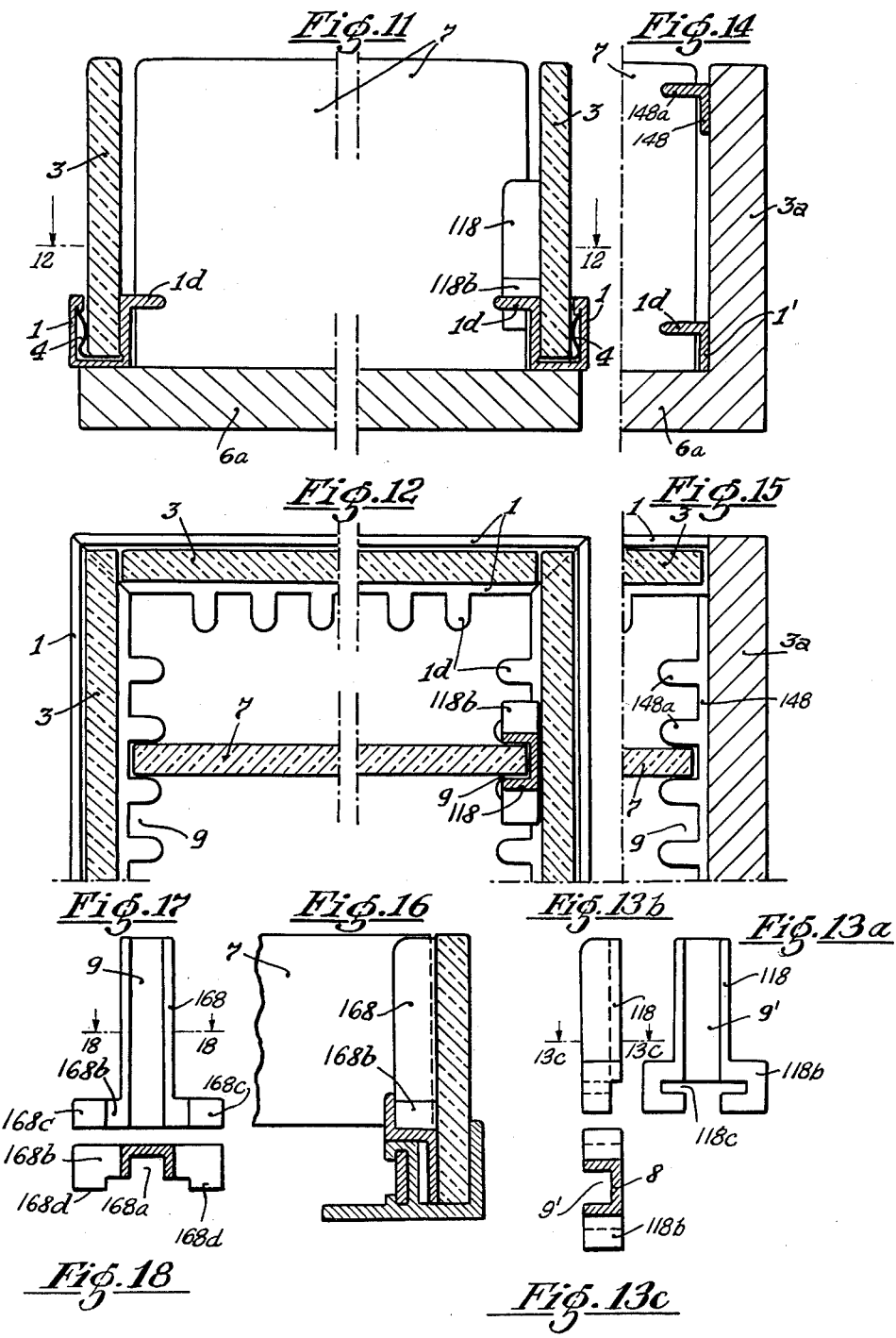

3,027,213
ADJUSTING DEVICE FOR GLASS BOUNDARY
WALLS COMPRISING UPPER AND LOWER SUP-
PORTING MEANS
Albert Weber, Morganstrasse, Wetzikon, Switzerland
Filed Dec. 23, 1958, Ser. No. 782,595
Claims priority, application Switzerland Dec. 27, 1957
4 Claims. (Cl. 312—140.3)

The present invention relates to an adjusting device for glass boundary walls comprising upper and lower supporting means. The lower supporting means comprise clamping members, securing the boundary walls in upright position. The upper supporting means comprise resilient means to firmly straddle one of the boundary glass walls. There are notches on the upper and lower supporting means for partition walls disposed at right angle to the boundary walls and to the bottom of the device. The upper notches register with the lower notches to insert the partition walls.

An object of the invention is to provide an open box of neat appearance, adapted to display goods in shops, upon counters or in display windows.

Another object of the invention is to provide a suitably constructed frame, in which boundary walls of glass are firmly, but removably fastened and partition walls between the boundary walls may be inserted in registering notches at any desired spacings.

In the drawings,

FIGS. 1 and 2 show partial cross-sections of the rectangular glass supporting means in connection with a sheet metal or wooden ground plate.

FIGS. 3 and 4 are plan views of two supporting means joined together at right angle, corresponding to FIGS. 1 and 2 respectively.

FIGS. 5 and 6 show a modification of the supporting means, FIG. 5 corresponding to FIG. 2 and FIG. 6 corresponding to FIG. 1.

FIGS. 7 and 8 show a member of the supporting means, FIG. 7 is an elevation and FIG. 8 a side view.

FIG. 9 and FIG. 10 show another modification of the supporting means: FIG. 9 is an elevation and FIG. 10 a side view.

FIG. 11 is a cross-section of a third embodiment of the supporting means.

FIG. 12 is a plan view of FIG. 11.

FIG. 13a is a front elevational view of a member in connection with the embodiment according to FIG. 11.

FIG. 13b is a side elevational view thereof.

FIG. 13c is a sectional view taken on the line 13c—13c of FIG. 13b.

FIG. 14 is a cross-section of a fourth embodiment of the supporting means.

FIG. 15 is a plan view of the fourth embodiment corresponding to FIG. 14.

FIG. 16 is a sectional view of the support according to FIG. 5 with the use of a modified member.

FIG. 17 is a front elevational view of the modified member of FIG. 16; and

FIG. 18 is a sectional view taken on the line 18—18 of FIG. 17.

The first embodiment comprises a bottom frame or frame member 1 made of a bottom portion 1a, an outer upright portion 1b and an inner upright portion 1c. A main boundary wall 3 of glass is situated within the frame member 1. A first tensioning member 4 is Z-shaped and has a notched leg 4b and a leg 4a all as shown. A plurality of second tensioning members are provided such as screws 5 passing through screw holes in the part 10 and engaging the leg 4a. Between the upright portion 1b and the leg 4a there is held the main boundary wall 3. 6 of FIG. 1 is a sheet metal plate. 7 are partition walls, 8 is a saddle member comprising a resilient part 8b and a horizontal part 8a. The part 8a is notched; the notches of the resilient part 8a and of the notched leg 4b register with each other and are dimensioned to locate the detachable glass partition walls 7 in rectangular relation to the main side walls 3 and parallel to the main front and rear walls 3. The part 8b may be modified as shown for instance at 68 in FIG. 6. The variation according to FIGS. 2 and 4 show instead of the sheet metal plate 6 of FIGS. 1 and 3 a board 6a of wood or other non-metallic material. A third tensioning member, such as a lining 10, preferably of elastic material may be used between the leg 4a and the main boundary glass walls 3. A rectangular frame constructed by the supporting means includes angles 2 which firmly secure the supporting means rectangularly to one another, at the respective corners. The modification shown by FIGS. 5 to 10 is modified in that firstly the screws 5 are replaced by fourth tensioning member, namely leaf springs 5a secured to the leg 4a and secondly in that the saddle member 68 is changed with respect to the resilient leg 8b which in this embodiment is formed of a rigid part and a leaf spring 5b. The embodiment shown in FIGS. 11 to 13 comprises supporting means consisting of a single channel piece 1 having a lateral notched extension with notches 9 between tooth portions 1d. The saddle piece 118 engages the partition 7 from the side and is supported as shown in the single channel piece 1 by engaging with its slot 8c two adjoining tooth portions 1d so that its central recess 9' will be in registry with the notch 9 of the two engaged tooth portions 1d. The saddle piece 118 is mounted by sliding movement in a direction parallel of the tooth portions 1d. A similarly constructed saddle piece 168 as shown in FIGS. 16 and 17 may also be used in the first or second embodiment.

In accordance with the modification of FIGS. 14 and 15, there are provided, like in FIG. 1, upper and lower notched parts; namely the upper part 148 that has a notched projection 148a which is resilient and corresponds to the part 8 (8a) of FIG. 1, and the part 1' with a notched projection 1d. The parts 148 and 1' are mounted on an upright wall 3a that is integral with the non-metallic base board or ground plate 6a.

I wish it to be understood that I do not desire to be limited to the exact details of construction shown and described, for obvious modifications will occur to a person skilled in the art.

I claim:

1. A positioning device comprising boundary walls and upright glass partitions therebetween, a rigid bottom frame member surrounding the lower edge of said boundary walls and including an upright portion, a tensioning member disposed between said bottom frame member and one of the surfaces of said boundary walls and extending throughout the length of said boundary wall and being operable for pressing said boundary wall against said upright portion, a projection formed on one of the said members adjacent the inner surface of said boundary walls and defining a series of notches adapted to receive an upright glass partition, said projection forming part of a Z-shape, and brace means disposed above said projection and defining notches vertically registering with said notches of said projection and operable to brace the upright glass partitions received in said projection.

2. A device, as claimed in claim 1, said bottom frame member including an upwardly turned channel, said tensioning member including a resilient element disposed in said channel, said projection being formed on said channel.

3. A device, as claimed in claim 1, said brace means comprising a channel-shaped element including a bottom portion having slots engaging said projection, the channel of said channel-shaped element registering with a notch of said projection.

4. A device, for use in adjustably positioning boundary walls and glass partitions, comprising in combination a rigid bottom frame member including an upright portion and adapted to surround the lower edge of the boundary walls, a tensioning member disposed adjacent said bottom member throughout the length thereof and adapted to engage a surface of said boundary walls for pressing the boundary walls against said upright portion, one of said members including a Z-shape and having a projection adapted to be disposed adjacent the inner surface of the boundary walls and defining a series of notches adapted to receive an upright glass partition, and brace means disposed above said portion and defining notches vertically registering with said notches of said projection for glass partition bracing.

References Cited in the file of this patent

UNITED STATES PATENTS

| | | |
|---|---|---|
| 1,523,136 | O'Connor | Jan. 13, 1925 |
| 1,699,013 | Nelson | Jan. 15, 1929 |
| 1,711,030 | Pifer | Apr. 30, 1929 |
| 1,712,177 | Duthie-Strachan | May 7, 1929 |
| 1,932,217 | Kaufman | Oct. 24, 1933 |
| 2,483,769 | Hickey | Oct. 4, 1949 |
| 2,529,826 | Walker | Nov. 14, 1950 |
| 2,743,148 | Tedaldi | Apr. 24, 1956 |